(12) United States Patent
Sugiyama

(10) Patent No.: US 9,436,018 B2
(45) Date of Patent: Sep. 6, 2016

(54) OPTICAL MODULE

(71) Applicant: Fujitsu Optical Components Limited, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 24 days.

(21) Appl. No.: 14/625,255

(22) Filed: Feb. 18, 2015

(65) Prior Publication Data
US 2015/0253592 A1    Sep. 10, 2015

(30) Foreign Application Priority Data

Mar. 7, 2014  (JP) ................ 2014-044607

(51) Int. Cl.
| | |
|---|---|
| *G02F 1/01* | (2006.01) |
| *G02F 1/03* | (2006.01) |
| *G02F 1/035* | (2006.01) |
| *G02F 1/21* | (2006.01) |

(52) U.S. Cl.
CPC ............ *G02F 1/0121* (2013.01); *G02F 1/035* (2013.01); *G02F 1/0327* (2013.01); *G02F 1/0344* (2013.01); *G02F 1/21* (2013.01); *G02F 2001/212* (2013.01)

(58) Field of Classification Search
CPC ............... G02F 1/0121; G02F 1/2252; G02F 2001/212; G02F 1/0327; G02F 1/0344; G02F 1/21
See application file for complete search history.

(56) References Cited

U.S. PATENT DOCUMENTS

| | | | | |
|---|---|---|---|---|
| 5,127,570 A | * | 7/1992 | Steitz | B23K 26/0661 174/254 |
| 6,291,877 B1 | * | 9/2001 | Usami | G06K 19/077 257/487 |
| 6,646,338 B2 | * | 11/2003 | Hashimoto | H01L 23/3114 257/668 |
| 7,259,678 B2 | * | 8/2007 | Brown | G06K 19/07728 340/572.7 |
| 7,333,344 B2 | * | 2/2008 | Huang | H05K 1/118 174/250 |
| 7,905,663 B2 | * | 3/2011 | Yasuda | G02B 6/4201 385/53 |
| 2005/0128086 A1 | * | 6/2005 | Brown | G06K 19/07728 340/572.8 |
| 2007/0015378 A1 | * | 1/2007 | Huang | H05K 1/118 439/67 |
| 2009/0324171 A1 | * | 12/2009 | Yasuda | G02B 6/4201 385/40 |
| 2012/0114340 A1 | * | 5/2012 | Sugiyama | G02B 6/4201 398/200 |

FOREIGN PATENT DOCUMENTS

| | | |
|---|---|---|
| JP | 2008-118568 | 5/2008 |
| JP | 2011-077208 | 4/2011 |
| JP | 2011-138049 | 7/2011 |
| JP | 2012-105104 | 5/2012 |

\* cited by examiner

*Primary Examiner* — Peter Radkowski
(74) *Attorney, Agent, or Firm* — Staas & Halsey LLP

(57) ABSTRACT

An optical module includes a circuit substrate and a terminal. The circuit substrate includes a first pattern, a second pattern, a first cover material, and a second cover material. The first pattern electrically is connected to the terminal and formed in a predetermined shape on a first surface of the circuit substrate. The second pattern is formed in a predetermined shape at a position corresponding to the first pattern on a surface opposite to the first surface. The first cover material covers at least a portion of the first pattern to be bent along with bending of the circuit substrate. The second cover material covers at least an end of the second pattern.

5 Claims, 7 Drawing Sheets

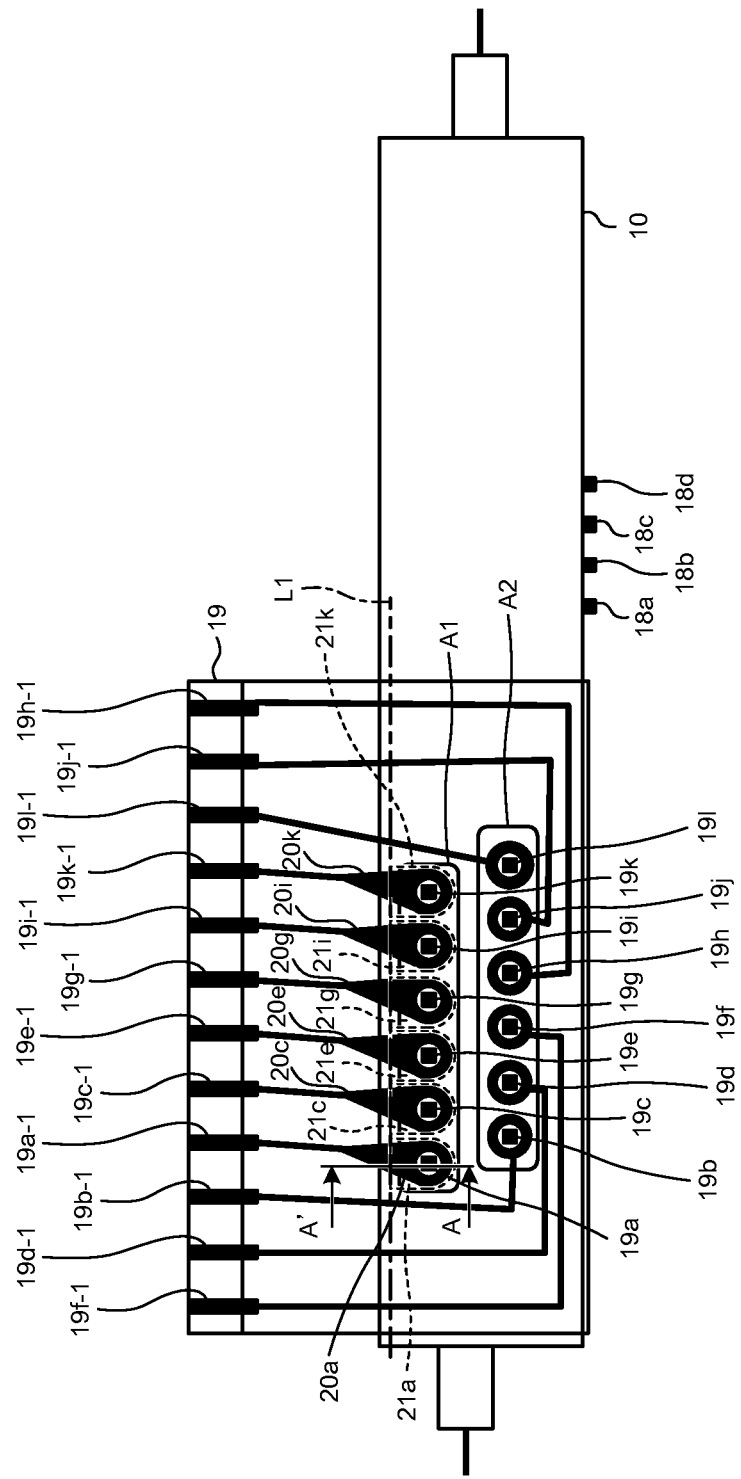

OPTICAL MODULE

CROSS-REFERENCE TO RELATED APPLICATION

This application is based upon and claims the benefit of priority of the prior Japanese Patent Application No. 2014-044607, filed on Mar. 7, 2014, the entire contents of which are incorporated herein by reference.

FIELD

The embodiments discussed herein are directed to an optical module.

BACKGROUND

In recent years, along with an increase in the scale of an optical transmission system, a size reduction in an optical module constituting the system has been demanded. While the optical module includes an optical modulator chip and electrical interfaces, the size of the electrical interface becomes a factor for determining the size of the optical module along with a size reduction of the optical modulator chip. The electrical interfaces are classified into a Radio Frequency (RF) pin to be connected to an RF electrode for a high-speed signal and a Direct Current (DC) pin to be connected to a DC electrode for controlling the optical modulator chip. More specifically, an RF signal is inputted from the RF pin provided on a side surface or bottom surface of a package and inputted into the RF electrode of the optical modulator chip via a relay board. Similarly, a DC signal is inputted from the DC pin provided on the side surface or bottom surface of the package and inputted into the DC electrode of the optical modulator chip via the relay board.

Since four signals at 32 Gbps are inputted into the RF pin of the electrical interfaces, four RF pins are provided in the package. If the interval between these four RF pins is reduced in order to reduce the size of the optical module, however, crosstalk between the RF pins (channels) is increased. Therefore, in order to achieve a size reduction of the electrical interfaces, how much the interval between the DC pins can be reduced while keeping the interval between the RF pins at a level satisfying the characteristic impedance becomes important.

For example, twelve DC pins are arranged horizontally in a row on a Flexible Printed Circuit (FPC) provided in the package. This becomes a factor for complicating a size reduction in the optical module. In view of this, reducing the horizontal width of the FPC by arranging the DC pins in two rows is effective in reducing the size of the optical module. However, in a configuration where wirings extending from the DC pins in the outer row go through between the DC pins in the center-side (DC electrode side) row, the interval between the DC pins needs to be set large. This imposes a limitation on the size reduction of the optical module.

In view of this, if the wirings extending from the DC pins in the outer row are set so as to circumvent an outer side of the DC pins at the both ends in the center-side (DC electrode side) row, the optical module can connect the DC pins to the corresponding DC electrodes without increasing the interval between the DC pins. This makes it possible to achieve a size reduction in the optical module.

Patent Document 1: Japanese Laid-open Patent Publication No. 2011-077208, Patent Document 2: Japanese Laid-open Patent Publication No. 2008-118568, Patent Document 3: Japanese Laid-open Patent Publication No. 2011-138049, and Patent Document 4: Japanese Laid-open Patent Publication No. 2012-105104 are introduced as the Related Art Document.

However, while a size reduction in the optical module is possible according to the above-described configuration, a space for the circumvention of the wirings extending from the DC pins in the outer row is requested. Keeping such a space eliminates a space for disposing reinforcing pins for preventing disconnection when the FPC is bent on the outer side of the DC pins at the both ends in the center-side (DC electrode side) row. Moreover, although a front surface of the FPC is covered by a cover material (for example, a coverlay), the periphery of the DC pins is opened in order to solder wiring patterns. A bending start line of the FPC is located in the vicinity of the center-side (DC electrode side) row of the DC pins. Thus, if the FPC is bent along the bending start line, the aforementioned wiring patterns are not protected especially at the opened portion. Therefore, disconnection is more likely to occur.

SUMMARY

According to an aspect of the embodiments, an optical module includes a circuit substrate and a terminal. The circuit substrate includes: a first pattern electrically connected to the terminal and formed in a predetermined shape on a first surface of the circuit substrate; a second pattern formed in a predetermined shape at a position corresponding to the first pattern on a surface opposite to the first surface; a first cover material that covers at least a portion of the first pattern to be bent along with bending of the circuit substrate; and a second cover material that covers at least an end of the second pattern.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1B is a side view illustrating the configuration of the optical module according to the present embodiment;

DESCRIPTION OF EMBODIMENTS

Preferred embodiments will be explained with reference to accompanying drawings. Note that the optical module disclosed by the present application shall not be limited by the following embodiments.

Figure 1A:
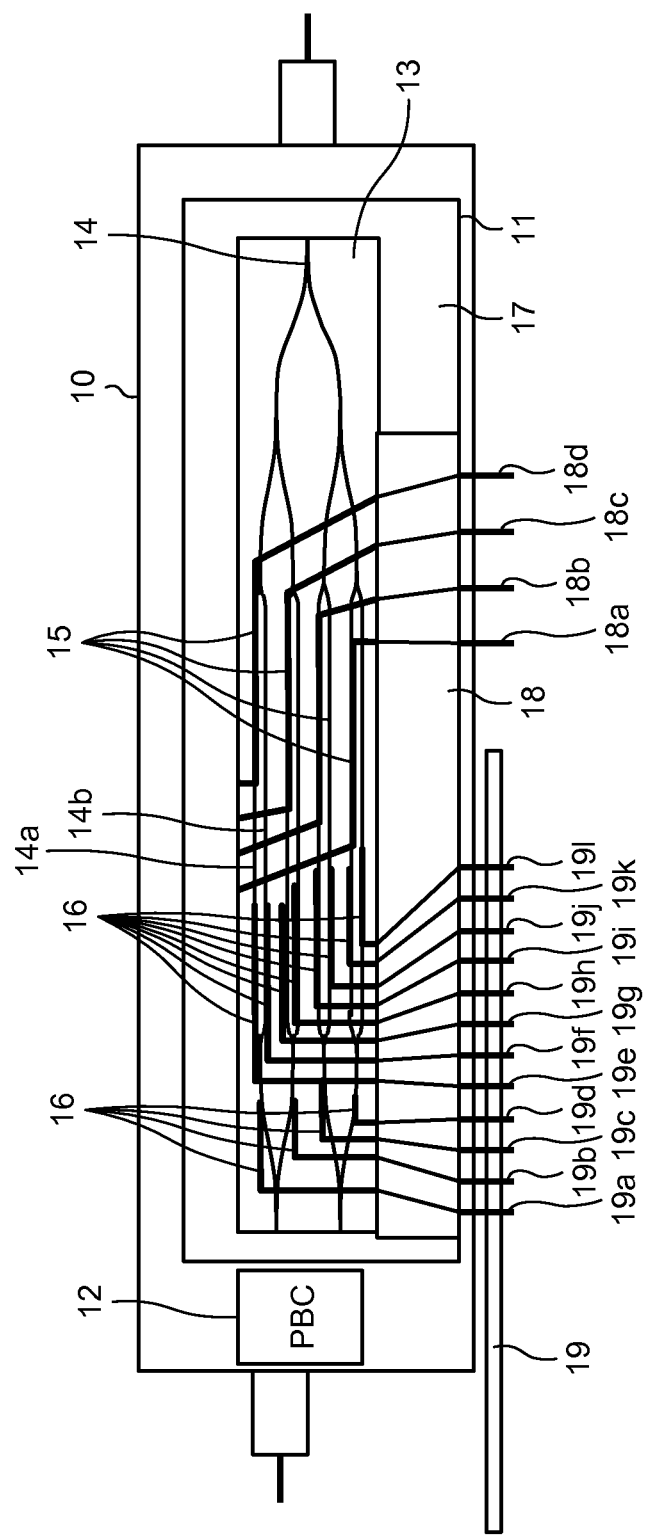
FIG. 1A is a top view illustrating a configuration of an optical module according to a present embodiment.

A configuration of an optical module according to an embodiment disclosed by the present application will be described first. FIG. 1A is a top view illustrating the configuration of an optical module 10 according to the present embodiment. As illustrated in FIG. 1A, the optical module 10 includes a package 11 and a Polarization Beam Coupler (PBC) 12. Electrodes 15 and 16 are provided in the vicinity of an optical waveguide 14 formed on a crystal substrate 13 inside the package 11. The crystal substrate 13 is made of an electro-optic crystal such as $LiNbO_3$ (LN) or $LiTaO_2$. The optical waveguide 14 is formed by forming a metal film such as Ti and subjecting the metal film to thermal diffusion or by performing patterning and then proton exchange in benzoic acid. The optical waveguide 14 constitutes a Mach-Zehnder interference system and the electrodes 15 and 16 are provided on the parallel waveguides of the Mach-Zehnder.

The crystal substrate 13 may be a III-V group semiconductor such as InP or GaAs.

Since the electrodes 15 and 16 utilize a refractive index change due to an electric field in a z-axis direction, the electrodes 15 and 16 are disposed directly above the optical waveguide 14. The electrodes 15 and 16 are coplanar electrodes each formed by patterning a signal electrode and a ground electrode on the optical waveguide 14. In order to prevent light propagating through the optical waveguide 14 to be absorbed by the signal electrode and the ground electrode, the optical module 10 includes a buffer layer between the crystal substrate 13 and the electrodes 15 and 16. The buffer layer is made of $SiO_2$ or the like with a thickness of about 0.2 to 2 μm.

When the optical module 10 is driven at high speed, terminations of the signal electrode and the ground electrode are connected to each other with a resistor so as to form a traveling-wave electrode and a microwave signal is applied from an input side thereof. At this time, the refractive indexes of the two optical waveguides 14 (for example, optical waveguides 14a and 14b) constituting the Mach-Zehnder are changed such as by +Δna and −Δnb, respectively, due to the electric field. Along with such a change, a phase difference between the optical waveguides 14 is also changed. As a result, phase-modulated signal light is outputted from the optical waveguide 14 due to Mach-Zehnder interference. The optical module 10 can obtain a high-speed optical response property by controlling the effective refractive index of the microwave by means of changing a cross-sectional shape of the electrodes 15 and 16 so as to match the speeds of the light and the microwave.

A Thermo Electric Cooler (TEC) 17 is a small cooling device by means of Peltier junction. The TEC 17 adjusts a temperature in the package 11 housing the crystal substrate 13, the optical waveguide 14, and the electrodes 15 and 16. The package 11 is provided with an FPC 19 via a relay board 18. If a high-frequency wave propagation loss is large in the electrode on the FPC 19, the modulation bandwidth is narrowed, thereby increasing the drive voltage thereof. Thus, in the optical module 10 handling high-frequency signals, it is desirable that the FPC 19 have a shortest possible length in order to reduce the high-frequency wave loss.

As illustrated in FIG. 1A, the relay board 18 includes four RF pins 18a to 18d connected to the electrodes 15 in a posterior part of an input-side side surface of the package 11. Moreover, the FPC 19 includes twelve DC pins 19a to 19l connected to the electrodes 16 in an anterior part of the input-side side surface of the package 11.

FIG. 1B is a side view illustrating the configuration of the optical module 10 according to the present embodiment. In FIG. 1B, a broken line in the FPC 19 represents that the pattern is on the rear surface thereof (surface closer to the package 11). As illustrated in FIG. 1B, the twelve DC pins 19a to 19l are arranged in two rows on the FPC 19. More specifically, the DC pins 19a, 19c, 19e, 19g, 19i, and 19k are arranged in the upper row and the DC pins 19b, 19d, 19f, 19h, 19j, and 19l are arranged in the lower row. Moreover, wirings extending from the DC pins 19b, 19d, 19f, 19h, 19j, and 19l in the lower row to DC electrodes 19b-1, 19d-1, 19f-1, 19h-1, 19j-1, and 19l-1 are formed so as to circumvent both sides of the DC pins 19a, 19c, 19e, 19g, 19i, and 19k in the upper row.

In the DC pins 19a to 19l, patterns formed on the front surface and rear surface of the FPC 19 are connected to each other via through holes. Among wiring patterns on the front surface side of the FPC 19, front surface wiring patterns 20a, 20c, 20e, 20g, 20i, and 20k which are wiring patterns from the DC pins 19a, 19c, 19e, 19g, 19i, and 19k in the upper row are each formed in a tear drop shape as illustrated in FIG. 1B. This serves to suppress disconnection due to bending on the front surface of the FPC 19. Among patterns on the rear surface side of the FPC 19, on the other hand, rear surface reinforcing patterns 21a, 21c, 21e, 21g, 21i, and 21k which are patterns from the DC pins 19a, 19c, 19e, 19g, 19i, and 19k in the upper row are each formed in an approximately semicircular shape as indicated by the broken lines in FIG. 1B. This serves to suppress disconnection due to bending also on the rear surface of the FPC 19.

The front surface wiring patterns 20a, 20c, 20e, 20g, 20i, and 20k are made of copper foil, for example. Note however that the rear surface reinforcing patterns 21a, 21c, 21e, 21g, 21i, and 21k are not necessarily made of the same material since the rear surface reinforcing patterns 21a, 21c, 21e, 21g, 21i, and 21k are not directly connected to the DC electrodes. Also regarding the pattern shapes, the front surface wiring patterns 20a, 20c, 20e, 20g, 20i, and 20k may each be formed in an approximately semicircular shape, for example.

Moreover, a cover material 19l is formed on the front surface of the FPC 19 in order to prevent the separation of the DC electrodes 19a-1 to 19l-1 and the wiring patterns. Note however that the cover material 191 is provided with cover material openings A1 and A2 around the DC pins 19a to 19l in order to enable soldering between the DC pins 19a to 19l and the aforementioned wiring patterns. A cover material is formed also on the rear surface of the FPC 19 in order to prevent the separation of the reinforcing patterns.

The FPC 19 is bent along a bending start line L1 indicated by a dashed-dotted line in FIG. 1B. As illustrated in FIG. 1B, the bending start line L1 is formed on the cover material 191 at a position corresponding to upper sides of the rear surface reinforcing patterns 21a, 21c, 21e, 21g, 21i, and 21k formed on the rear surface of the FPC 19. With this bending start line L1, the FPC 19 is bent down at a portion covered by the cover material 191. Therefore, as compared to a case being bent down at the cover material opening A1, for example, wiring strength at the bent portion is increased, thereby further suppressing disconnection due to the bending.

Figure 2:
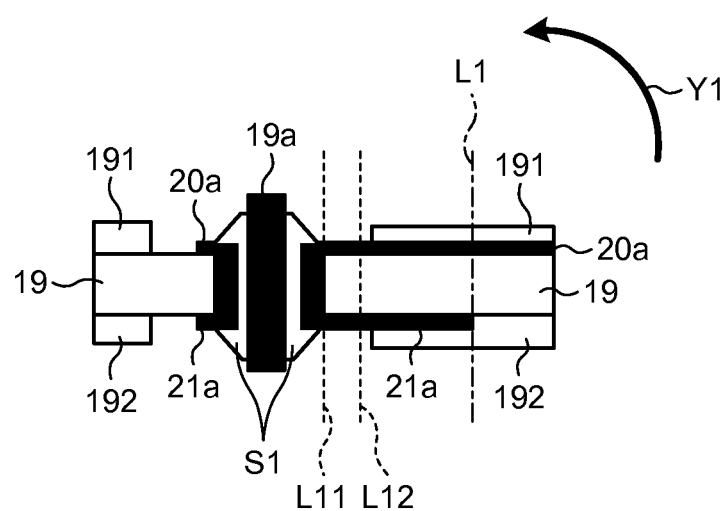
FIG. 2 is a cross-sectional view taken along line A-A' of FIG. 1B.

FIG. 2 is a cross-sectional view taken along line A-A' in FIG. 1B. As illustrated in FIG. 2, on either side of the DC pin 19a, the front surface wiring pattern 20a and the rear surface reinforcing pattern 21a are formed on the front surface and rear surface of the FPC 19, respectively. Furthermore, part of the front surface wiring pattern 20a is protected by the cover material 191. Part (for example, a tip portion) of the rear surface reinforcing pattern 21a is protected by a cover material 192. Note that a solder S1 is filled around the DC pin 19a, thereby electrically connecting the front surface wiring patterns 20a on both sides thereof.

When manufacturing the optical module 10, the FPC 19 is bent in a direction indicated by an arrow Y1 in FIG. 2. In such bending, the FPC 19 is bent at the portion (place indicated by the bending start line L1) reinforced by the cover materials 191 and 192 and the rear surface reinforcing pattern 21a. Therefore, as compared to when being bent at a portion indicated by a broken line L11 or a broken line L12, a possibility of the disconnection of the front surface wiring pattern 20a due to a stress or the like when being bent is reduced.

As described above, the optical module 10 includes the FPC 19 and the DC pin 19a. The FPC 19 includes the front surface wiring pattern 20a, the rear surface reinforcing pattern 21a, the front surface cover material 191, and the rear surface cover material 192. The front surface wiring pattern 20a is electrically connected to the DC pin 19a and formed in a predetermined shape (for example, a tear drop shape) on a first surface (for example, front surface) of the FPC 19. The rear surface reinforcing pattern 21a is formed in a predetermined shape (for example, a shape obtained by adding a rectangle to a semicircle) at a position corresponding to the front surface wiring pattern 20a on a surface (for example, rear surface) opposite to the first surface. The front surface cover material 191 covers at least a portion of the front surface wiring pattern 20a that is to be bent along with the bending of the FPC 19. The rear surface cover material 192 covers at least an end of the rear surface reinforcing pattern 21a. In the optical module 10, the FPC 19 may be bent toward the first surface at the end of the rear surface reinforcing pattern 21a and the front surface wiring pattern 20a at a position corresponding to that end, for example.

Consequently, the bending stress on the FPC 19 is applied to the portion of the front surface wiring pattern 20a covered by the cover material 191 before being applied to the cover material opening A1 (for example, the DC pin 19a). Thus, the aforementioned stress is not directly transmitted to the cover material opening A1. Therefore, the disconnection of the wirings in the cover material opening A1 (for example, the front surface wiring pattern 20a around the DC pin 19a) due to the aforementioned stress is prevented. As a result, reliability (resistance to fatigue or connection strength) and electrical characteristics of the optical module 10 are improved.

First Modified Embodiment

The first modified embodiment will be described next. An optical module according to the first modified embodiment has a configuration similar to that of the optical module 10 according to the above-described embodiment except that rear surface reinforcing patterns are included in the FPC 19. Therefore, in the first modified embodiment, components common to those of the above-described embodiment will be denoted by the same reference numerals and the detailed description thereof will be omitted.

Figure 3:
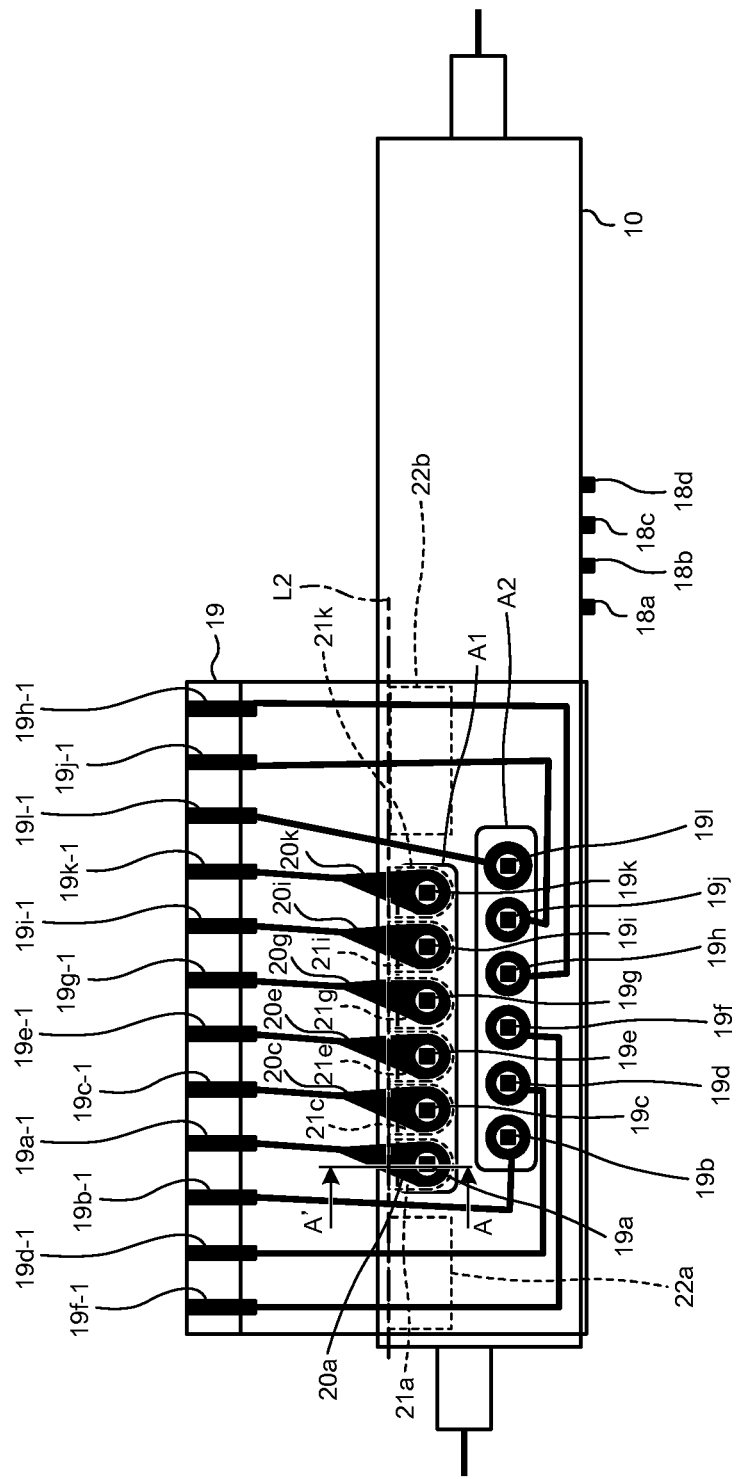
FIG. 3 is a side view illustrating a configuration of an optical module according to a first modified embodiment.

FIG. 3 is a side view illustrating the configuration of the optical module 10 according to the first modified embodiment. In FIG. 3, a broken line in the FPC 19 represents that the pattern is on the rear surface thereof (surface closer to the package 11). As illustrated in FIG. 3, rectangular rear surface reinforcing patterns 22a and 22b are further provided on the rear surface of the FPC 19 at two places on both sides of the rear surface reinforcing patterns 21a, 21c, 21e, 21g, 21i, and 21k. Each of the rear surface reinforcing patterns 22a and 22b is formed such that the upper side thereof (side closer to the DC electrodes 19a-1 to 19l-1) coincides with a bending start line L2. In other words, the optical module 10 according to the first modified embodiment may further include the rear surface reinforcing pattern 22a formed such that one side thereof is aligned in the same straight line with one side of the rear surface reinforcing pattern 21a on the surface opposite to the aforementioned first surface. This allows the FPC 19 to be bent more reliably along the bending start line L2. Thus, the disconnection of the wirings in the cover material opening A1 (for example, the front surface wiring pattern 20a around the DC pin 19a) due to the bending stress on the FPC 19 is more easily prevented.

Note that the rear surface reinforcing patterns 22a and 22b are not necessarily provided in addition to the other rear surface reinforcing patterns 21a, 21c, 21e, 21g, 21i, and 21k extending from the DC pins 19a, 19c, 19e, 19g, 19i, and 19k. In other words, rear surface reinforcing patterns in the FPC 19 may be the rear surface reinforcing patterns 22a and 22b only. Moreover, the shape of the rear surface reinforcing patterns 22a and 22b may be any shape within a range capable of reinforcing the wirings such as a semicircle, a semi-ellipse, a trapezoid, a rhombus, a triangle, a polygon, and a combination thereof, without being limited to the rectangle. Moreover, the two rear surface reinforcing patterns 22a and 22b do not necessarily have the same shape. Furthermore, the rear surface reinforcing patterns 22a and 22b are not necessarily provided below the bending start line L2. The rear surface reinforcing patterns 22a and 22b may be provided above the bending start line L2.

Second Modified Embodiment

The second modified embodiment will be described next. An optical module according to the second modified embodiment has a configuration similar to that of the optical module 10 according to the above-described embodiment except for wirings in the FPC 19. Therefore, in the second modified embodiment, components common to those of the above-described embodiment will be denoted by the same reference numerals and the detailed description thereof will be omitted.

Figure 4A:
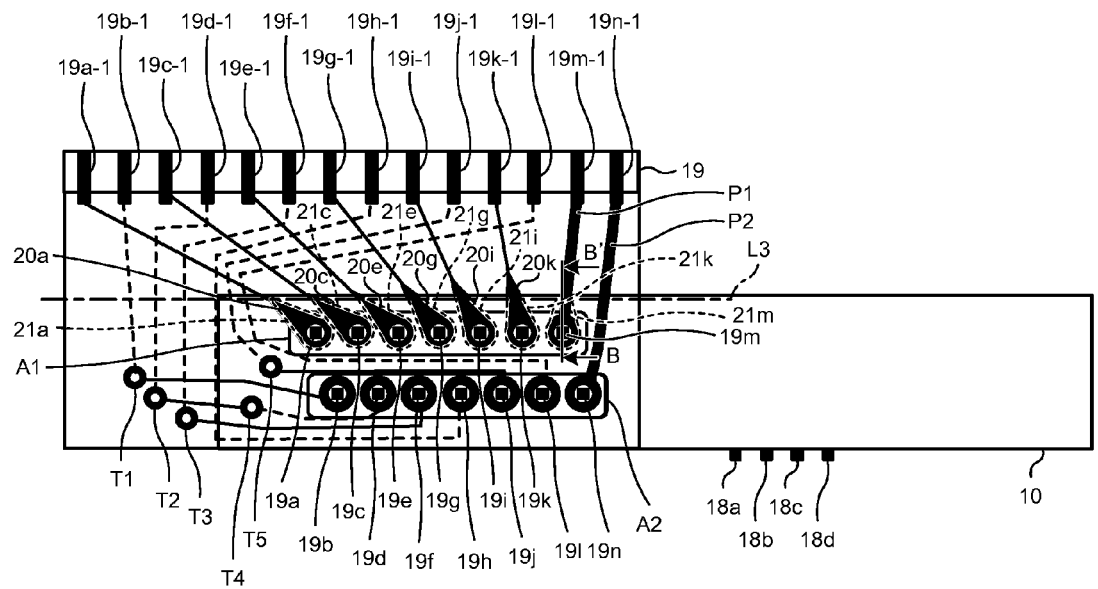
FIG. 4A is a side view illustrating a configuration of an optical module according to a second modified embodiment.

FIG. 4A is a side view illustrating the configuration of the optical module 10 according to the second modified embodiment. In FIG. 4A, a broken line in the FPC 19 represents that the pattern is on the rear surface thereof (surface closer to the package 11). As illustrated in FIG. 4A, the twelve DC pins 19a to 19l are arranged in two rows on the FPC 19. More specifically, the DC pins 19a, 19c, 19e, 19g, 19i, and 19k are arranged in the upper row and the DC pins 19b, 19d, 19f, 19h, 19j, and 19l are arranged in the lower row. Moreover, wirings extending from the DC pins 19b, 19d, 19f, 19h, 19j, and 19l in the lower row to the DC electrodes 19b-1, 19d-1, 19f-1, 19h-1, 19j-1, and 19l-1 are formed so as to circumvent a left side of the DC pin 19a on the extreme left in the upper row. In other words, in the optical module 10 according to the second modified embodiment, a plurality of front surface wiring patterns 20a and 20c are formed in directions different from each other on the first surface. On the other hand, a plurality of rear surface reinforcing patterns 21a and 21c are formed on the aforementioned opposite surface such that directions thereof coincide with the directions of the corresponding front surface wiring patterns 20a and 20c. Therefore, crosstalk between RF signals and DC signals due to interference from the RF pins 18a to 18d is suppressed.

Note that the left end of the FPC 19 is projected more leftward than an output-side interface end of the package 11 in the optical module 10 according to the second modified embodiment by the circumvention of the wirings with the DC pins 19a to 19l being output sources. However, the FPC 19 will not interfere with other interface when mounted since the left end projected portion of the FPC 19 is located at a position (vacant space) in parallel with an output-side optical fiber. In other words, the optical module 10 can achieve a size reduction thereof while suppressing crosstalk between the DC signals and the RF signals by effectively utilizing the limited space in the package 11.

Although the front surface wiring patterns 20a, 20c, 20e, 20g, 20i, and 20k are each formed in a tear drop shape also in the second modified embodiment, the directions thereof are different from one another since the tips thereof extend toward the corresponding DC electrodes.

Moreover, the cover material 191 having the cover material openings A1 and A2 around the DC pins 19a to 19l is provided on the front surface of the FPC 19 so as to cover the front surface wiring pattern 20a and the like. Similarly, the cover material 192 is provided on the rear surface of the FPC 19 so as to cover the rear surface reinforcing pattern 21a and the like. These serve to suppress the separation of the patterns.

As illustrated in FIG. 4A, the DC pins 19a, 19c, 19e, 19g, 19i, and 19k in the upper row are connected to the DC electrodes 19a-1, 19c-1, 19e-1, 19g-1, 19i-1, and 19k-1, respectively, via the wirings formed on the front surface of the FPC 19. The DC pins 19b, 19d, 19f, 19h, 19j, and 19l in the lower row, on the other hand, are connected to the DC electrodes 19b-1, 19d-1, 19f-1, 19h-1, 19j-1, and 19l-1, respectively, via the wirings formed on both sides of the FPC 19. Moreover, in the lower row, only the wirings of the DC pins 19d, 19h, and 19l among the DC pins 19b, 19d, 19f, 19h, 19j, and 19l are formed from the rear surface of the FPC 19 such that adjacent channels are wired on the surfaces of the FPC 19 opposite to each other. This increases a wiring interval between the adjacent DC pins and thereby reduces crosstalk among signals flowing through the wirings from the DC pins 19b, 19d, 19f, 19h, 19j, and 19l.

Note however that if all of the wirings connecting between the DC pins 19b, 19d, 19f, 19h, 19j, and 19l in the lower row and the DC electrodes 19b-1, 19d-1, 19f-1, 19h-1, 19j-1, and 19l-1 are formed on the rear surface of the FPC 19, crossing of the wirings occurs in a left end portion (light output side) of the FPC 19. In view of this, the FPC 19 is provided with through holes T1 to T5 for connecting between the wirings on the front surface thereof and the wirings on the rear surface thereof. The wiring is changed to the opposite surface as needed. In the example illustrated in FIG. 4A, the wiring formed on the rear surface from the DC pin 19d, for example, is formed so as to be transferred once to the front surface via the through hole T4 and returned to the rear surface again by means of the through hole T2. This prevents the wiring connecting between the DC pin 19d and the DC electrode 19d-1 from crossing with the wirings connecting between the DC pins 19f and 19h and the DC electrodes 19f-1 and 19h-1 on the rear surface of the FPC 19. As a result, a short circuit between the wirings is prevented from occurring before happens.

Moreover, according to the optical module 10 of the second modified embodiment, a space in a lower part of the FPC 19 for guiding the wirings from the DC pins 19b, 19d, 19f, 19h, 19j, and 19l in the lower row in a left direction is reduced. Therefore, a need to take measures such as enlarging the FPC 19 in a downward direction or disposing the DC pins 19a to 19l at higher positions is eliminated, thereby making it possible to achieve a size reduction in the optical module 10. Furthermore, since the arrangement of the DC electrodes 19a-1 to 19l-1 coincides with the arrangement of the DC pins 19a to 19l as illustrated in FIG. 4A, compatibility with the related DC electrode arrangement is maintained.

The FPC 19 is provided with TEC pins 19m and 19n in parallel with the aforementioned twelve DC pins 19a to 19l. The TEC pins 19m and 19n are pins used for supplying a power from outside to the temperature adjustment TEC 17 mounted in the package 11. As illustrated in FIG. 4A, power supply lines P1 and P2 connecting between the TEC pins 19m and 19n and TEC electrodes 19m-1 and 19n-1, respectively, are formed on the front surface of the FPC 19. Note that the power supply lines P1 and P2 may be formed on the rear surface (surface closer to the package 11) of the FPC 19.

The power supply lines P1 and P2 have a line width according to an amount of current to be flowed therethrough and a thickness of plating (for example, a width greater than that of the wirings W1 to W5). The width of the power supply lines P1 and P2 is about 300 to 500 μm, for example, whereas the width of other wirings is about 100 μm, for example. Note however that the power supply lines P1 and P2 have difficulty in being wired by means of through holes especially when a current amount thereof is large. Thus, it is desirable that the power supply lines P1 and P2 be formed only on one surface (for example, the front surface) of the FPC 19.

Note that there is a concern about crosstalk between the current flowing through the power supply lines P1 and P2 and the RF signals in the optical module 10 according to the second modified embodiment due to the provision of the power supply lines P1 and P2 in the right end portion of the FPC 19. However, the interference from the RF signals to the current is small as compared to the interference from the RF signals to the DC signals. Thus, the generation of the aforementioned crosstalk is limited.

The wiring (power supply line P1) extending from the TEC pin 19m has a smaller risk of disconnection upon bending since a width thereof is larger than that of other wirings. Therefore, the wiring extending from the TEC pin 19m is not necessarily formed in a tear drop shape. However, it is desirable that a rear surface reinforcing pattern 21m be provided on the rear surface. The rear surface reinforcing pattern 21m extends toward the corresponding TEC electrode 19m-1 in the same manner as the other rear surface reinforcing patterns 21a, 21c, 21e, 21g, 21i, and 21k extend toward the corresponding DC electrodes. However, the rear surface reinforcing patterns 21a, 21c, 21e, 21g, 21i, 21k, and 21m end on a bending start line L3 and are not formed above the bending start line L3 as illustrated in FIG. 4A. In other words, the tips of the plurality of rear surface reinforcing patterns 21a, 21c, 21e, 21g, 21i, 21k, and 21m are positioned on the bending start line L3. This allows the FPC 19 to be bent along the bending start line L3.

Note that it is desirable that the shapes, directions, positions, sizes, and the like, of the rear surface reinforcing patterns 21a, 21c, 21e, 21g, 21i, and 21k coincide with the shapes, directions, positions, sizes, and the like, of the corresponding front surface wiring patterns 20a, 20c, 20e, 20g, 20i, and 20k. This makes it possible to avoid as much as possible that adjacent patterns (for example, the rear surface reinforcing pattern 21a and the front surface wiring pattern 20c) come close to each other (for example, overlap each other) on the front surface and the rear surface. As a result, crosstalk is reduced.

Figure 4B:
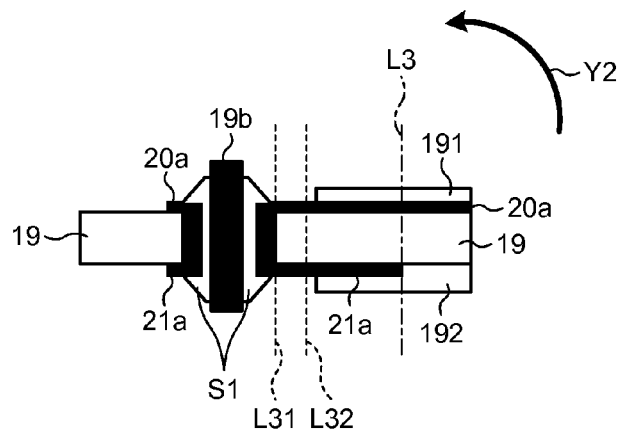
FIG. 4B is a cross-sectional view taken along line B-B' of FIG. 4A.

FIG. 4B is a cross-sectional view taken along line B-B' in FIG. 4A. As illustrated in FIG. 4B, on either side of the DC pin 19b, the front surface wiring pattern 20a and the rear surface reinforcing pattern 21a are formed on the front surface and rear surface of the FPC 19, respectively. Furthermore, part of the front surface wiring pattern 20a is protected by the cover material 191. Part (for example, a tip portion) of the rear surface reinforcing pattern 21a is protected by the cover material 192. Note that the solder S1 is filled around the DC pin 19b, thereby electrically connecting the front surface wiring patterns 20a on both sides thereof.

When manufacturing the optical module 10, the FPC 19 is bent in a direction indicated by an arrow Y2 in FIG. 4B. In such bending, the FPC 19 is bent at the portion (place indicated by the bending start line L3) reinforced by the cover materials 191 and 192 and the rear surface reinforcing pattern 21a. Therefore, as compared to when being bent at a portion indicated by a broken line L31 or a broken line L32, a possibility of the disconnection of the front surface wiring pattern 20a due to a stress or the like when being bent is reduced.

Third Modified Embodiment

The third modified embodiment will be described next. An optical module according to the third modified embodiment has a configuration similar to that of the optical module 10 according to the above-described embodiment except for wirings in the FPC 19. Therefore, in the third modified embodiment, components common to those of the above-described embodiment will be denoted by the same reference numerals and the detailed description thereof will be omitted.

Figure 5A:
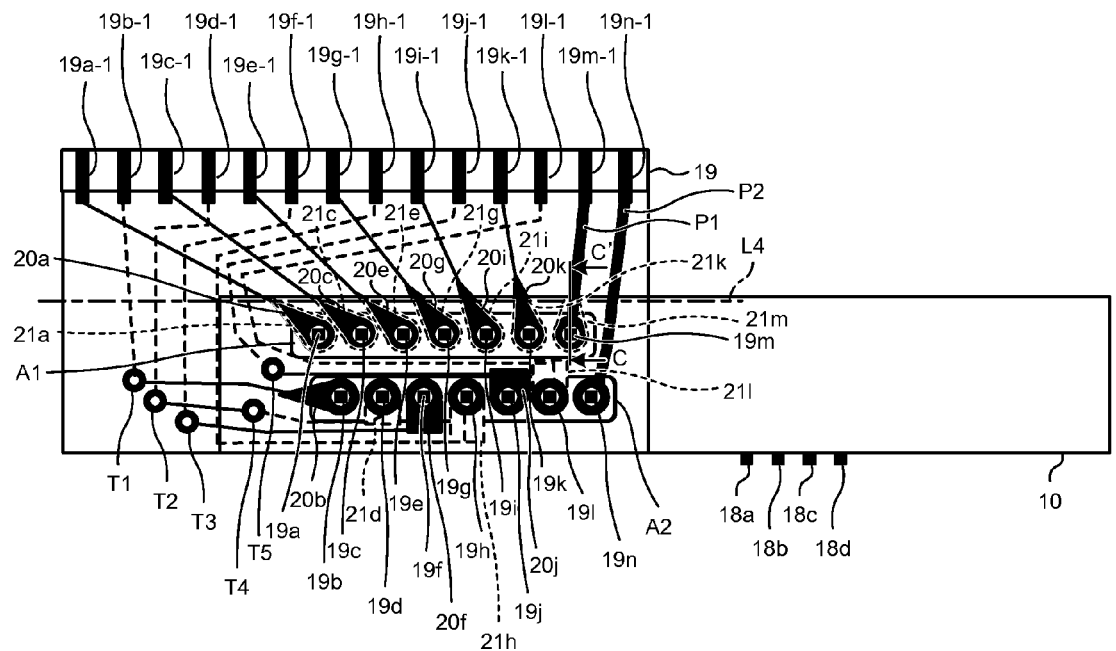
FIG. 5A is a side view illustrating a configuration of an optical module according to a third modified embodiment.

FIG. 5A is a side view illustrating the configuration of the optical module according to the third modified embodiment. As illustrated in FIG. 5A, a front surface wiring pattern 20b of the DC pin 19b in the lower row is formed in a tear drop shape. In this manner, patterns formed in the DC pins 19b, 19d, 19f, 19h, 19j, and 19l in the lower row may each be formed in a tear drop shape as with the patterns in the upper row. Note however that the patterns in the lower row go through a narrower space as compared to the patterns in the upper row in order to reduce the size of the package. Thus, it is difficult to form all of the DC pins 19b, 19d, 19f, 19h, 19j, and 19l in the lower row in a tear drop shape.

Thus, from the perspective of suppressing disconnection while reducing the pattern length thereof, patterns 21d, 20f, 21h, 20j, and 21l of the DC pins 19d, 19f, 19h, 19j, and 19l may each be formed in a rectangular shape as illustrated in FIG. 5A. The front surface wiring patterns 20f and 20j and the rear surface reinforcing patterns 21d, 21h, and 21l each formed in a rectangular shape in the vicinity of the DC pins 19d, 19f, 19h, 19j, and 19l bend at a right angle as illustrated in FIG. 5A. Each of the front surface wiring patterns 20f and 20j and the rear surface reinforcing patterns 21d, 21h, and 21l is formed so as to be thinner in a portion after the aforementioned bending than in a portion before the aforementioned bending. In other words, the optical module according to the third modified embodiment further includes the rear surface reinforcing pattern 21d and the front surface wiring pattern 20f each formed on the first surface or the opposite surface and having the bent portion. This enables wiring resistant to disconnection and in a narrow space.

Note that the shape of the front surface wiring patterns 20f and 20j and the rear surface reinforcing patterns 21d, 21h, and 21l may be any shape within a range capable of reinforcing the wirings and achieving a size reduction such as a semicircle, a semi-ellipse, a trapezoid, a rhombus, a triangle, a polygon, and a combination thereof, for example, without being limited to the rectangle. Moreover, the patterns 21d, 20f, 21h, 20j, and 21l do not necessarily have the same shape.

In the optical module 10 according to the third modified embodiment, there is a concern about an increase in crosstalk among the patterns since the front surface wiring patterns 20f and 20j and the rear surface reinforcing patterns 21d, 21h, and 21l are formed with a large width. However, an interval between the patterns is increased since the patterns 21d, 20f, 21h, 20j, and 21l are formed alternately on the rear surface and front surface of the FPC 19. As a result, crosstalk is suppressed.

Figure 5B:
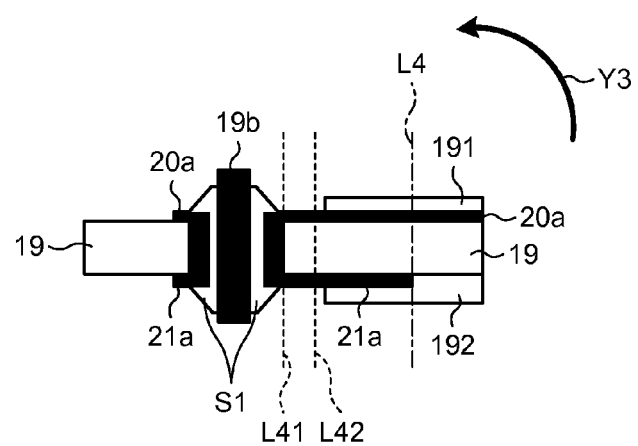
FIG. 5B is a cross-sectional view taken along line C-C' of FIG. 5A.

FIG. 5B is a cross-sectional view taken along line C-C' in FIG. 5A. As illustrated in FIG. 5B, on either side of the DC pin 19b, the front surface wiring pattern 20a and the rear surface reinforcing pattern 21a are formed on the front surface and rear surface of the FPC 19, respectively. Furthermore, part of the front surface wiring pattern 20a is protected by the cover material 191. Part (for example, a tip portion) of the rear surface reinforcing pattern 21a is protected by the cover material 192. Note that the solder S1 is filled around the DC pin 19b, thereby electrically connecting the front surface wiring patterns 20a on both sides thereof.

When manufacturing the optical module 10, the FPC 19 is bent in a direction indicated by an arrow Y3 in FIG. 5B. In such bending, the FPC 19 is bent at the portion (place indicated by a bending start line L4) reinforced by the cover materials 191 and 192 and the rear surface reinforcing pattern 21a. Therefore, as compared to when being bent at a portion indicated by a broken line L41 or a broken line L42, a possibility of the disconnection of the front surface wiring pattern 20a due to a stress or the like when being bent is reduced.

Application Example

Figure 6:
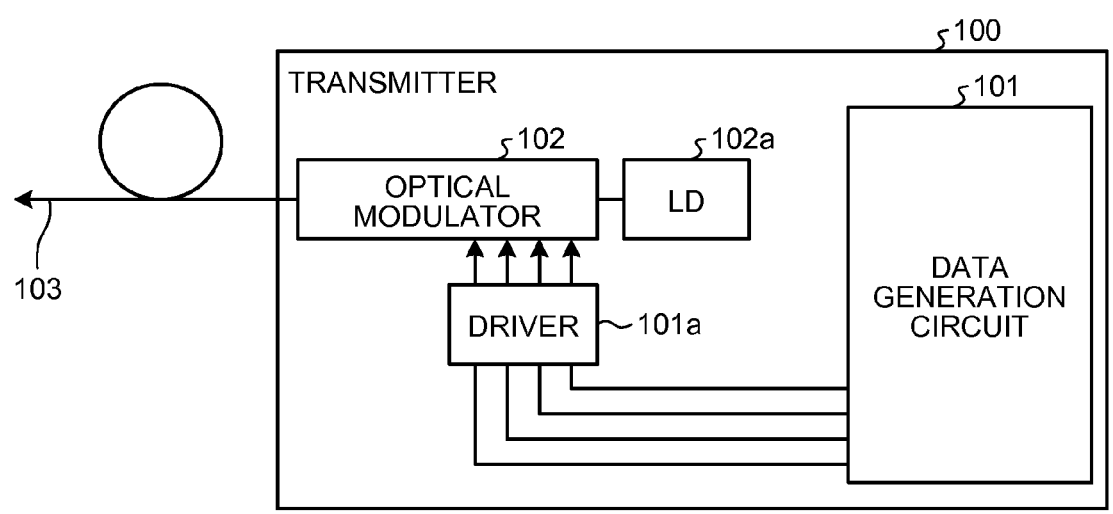
FIG. 6 is a diagram illustrating a configuration of a transmitter in which the optical module according to the aforementioned embodiment and modified embodiments is mounted.

An optical modulator employing the above-described optical module 10 may be effectively applied to a transmitter, for example, since such an optical modulator can simultaneously achieve high reliability and high mountability. FIG. 6 is a diagram illustrating a configuration of a transmitter 100 in which the optical module 10 according to any one of the above-described embodiment and modified embodiments is mounted. As illustrated in FIG. 6, the transmitter 100 includes a data generation circuit 101, an optical modulator 102, and an optical fiber 103. Moreover, the data generation circuit 101 includes a driver 101a and the optical modulator 102 includes a Laser Diode (LD) 102a. These components are connected to one another unidirectionally or bidirectionally so as to enable the input and output of various signals or data. Data generated by the data generation circuit 101 is converted from an electric signal into an optical signal by the optical modulator 102. The data is then transmitted to the outside of the device with the optical fiber 103 used as a transmission medium.

In particular, the optical module 10 can be effectively applied to an optical modulator capable of connecting DC pins to a large number of DC electrodes with the use of the FPC 19. Examples of such an optical modulator may include an In-phase/Quadrature (I/Q) optical modulator, a polarization multiplexing optical modulator, an ITXA, an ICR, an optical transmitter and receiver integrated device, and the like. Note that the optical module 10 may be applied to a receiver without being limited to the transmitter.

In the optical module 10 according to the above-described embodiment and modified embodiments, the RF pins 18a to 18d, the DC pins 19a to 19l, and the TEC pins 19m and 19n are arranged on the same side surface of the package 11 in order to reduce the mounting area thereof. Note however that the RF pins 18a to 18d, the DC pins 19a to 19l, and the TEC pins 19m and 19n may be arranged on different surfaces such as on the left side surface and the right side surface, for example. Moreover, the substrate on which the DC pins 19a to 19l and the TEC pins 19m and 19n are arranged may be a PCB, for example, without being limited to the FPC.

In the optical module 10 according to the above-described embodiment and modified embodiments, wiring patterns for suppressing disconnection were the wiring patterns solder-connected to the DC pins (for example, the DC pin 19a). However, the above-described wiring patterns may be patterns of RF pins or TEC pins without being limited to the patterns of the DC pins.

Moreover, in the optical module 10 according to the above-described embodiment and modified embodiments, the DC pins 19a to 19l are arranged in two rows of the upper and lower parts on the FPC 19. However, the number of rows may be three or more without being limited to two. For example, when the DC pins 19a to 19l form three rows, wirings from the DC pins in the second row (middle part) and the third row (lowermost part) are formed so as to circumvent the left side of the DC pin on the leftmost end in the first row (uppermost part). This further reduces the horizontal width of the FPC 19, thereby making it possible to achieve a further size reduction of the optical module 10.

Furthermore, the optical module 10 according to the second and third modified embodiments has wirings such that the arrangement of the DC electrodes 19a-1 to 19l-1 coincides with the arrangement of the DC pins 19a to 19l. However, the above-described arrangements are not necessarily caused to coincide with each other (arranged in order) since a size reduction is possible as long as the wirings in the lower row are formed alternately on the front surface and the rear surface of the FPC 19.

Moreover, in the description set forth above, the individual configurations and operations have been described for the embodiment and modified embodiments, respectively. However, the optical modules 10 according to the above-described embodiment and modified embodiments each may also have a component characteristic of the other modified embodiment. Moreover, a combination of the embodiment and modified embodiments can take any configuration such as a combination of three or more without being limited to two. For example, the optical module 10 according to the above-described embodiment may have the TEC pins 19m and 19n, the power supply lines P1 and P2, and the TEC electrodes 19m-1 and 19n-1 according to the second (or third) modified embodiment on the front surface of the FPC 19. Alternatively, the optical module 10 according to the second (or third) modified embodiment is configured such that the FPC 19 includes the rear surface reinforcing patterns 22a and 22b according to the first modified embodiment on the rear surface thereof. Furthermore, a single optical module 10 may possess all the components described in the aforementioned embodiment and first to third modified embodiments within a compatible range.

According to the embodiment of the optical module disclosed by the present application, disconnection can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising a circuit substrate and a terminal, wherein
the circuit substrate includes:
a first pattern electrically connected to the terminal and formed in a predetermined shape on a first surface of the circuit substrate;
a second pattern formed in a predetermined shape at a position corresponding to the first pattern on a surface opposite to the first surface;
a first cover material that covers at least a portion of the first pattern to be bent along with bending of the circuit substrate; and
a second cover material that covers at least an end of the second pattern, wherein
the first pattern, among wiring patterns on a front surface side of the circuit substrate, is formed in a tear drop shape and
the second pattern, among patterns on a rear surface side of the circuit substrate, is formed in a semicircular shape.

2. The optical module according to claim 1, wherein the circuit substrate is bent toward the first surface side at the end of the second pattern and the first pattern at a position corresponding to the end.

3. The optical module according to claim 1, wherein the circuit substrate includes a third pattern formed such that one side thereof is aligned in a same straight line with one side of the second pattern on the surface opposite to the first surface.

4. The optical module according to claim 1, wherein
a plurality of the first patterns are formed on the first surface such that directions thereof are different from one another, and
a plurality of the second patterns are formed on the opposite surface such that directions thereof coincide with the directions of the corresponding first patterns.

5. The optical module according to claim 1, wherein the circuit substrate includes a fourth pattern formed on the first surface or the opposite surface and including a bent portion.

* * * * *